(12) United States Patent
Ermilios et al.

(10) Patent No.: US 10,902,271 B2
(45) Date of Patent: Jan. 26, 2021

(54) RECOGNIZING A RAISED OBJECT ON THE BASIS OF PERSPECTIVE IMAGES

(71) Applicants: Connaught Electronics Ltd., Tuam (IE); Bayerische Motoren Werke Aktiengesellschaft, Munich (DE)

(72) Inventors: Pantelis Ermilios, Tuam (IE); Jonathan Horgan, Tuam (IE); Ciaran Hughes, Tuam (IE); Guenter Bauer, Petershausen (DE)

(73) Assignees: Connaught Electronics Ltd., Tuam (IE); Bayerische Motoren Werke Aktiengesellschaft, Munich (DE)

( * ) Notice: Subject to any disclaimer, the term of this patent is extended or adjusted under 35 U.S.C. 154(b) by 28 days.

(21) Appl. No.: 16/468,381

(22) PCT Filed: Dec. 19, 2017

(86) PCT No.: PCT/EP2017/083531
§ 371 (c)(1),
(2) Date: Jun. 11, 2019

(87) PCT Pub. No.: WO2018/114943
PCT Pub. Date: Jun. 28, 2018

(65) Prior Publication Data
US 2019/0354778 A1 Nov. 21, 2019

(30) Foreign Application Priority Data
Dec. 19, 2016 (DE) .................... 10 2016 124 747

(51) Int. Cl.
*G06K 9/00* (2006.01)
*G06T 7/30* (2017.01)
(Continued)

(52) U.S. Cl.
CPC .......... *G06K 9/00791* (2013.01); *B60R 11/04* (2013.01); *G06K 9/6202* (2013.01);
(Continued)

(58) Field of Classification Search
CPC ............. G06K 9/00791; G06K 9/6202; G06K 2009/6213; G06T 7/70; G06T 7/30;
(Continued)

(56) References Cited

U.S. PATENT DOCUMENTS

2014/0009614 A1 1/2014 Yoon
2015/0035983 A1 2/2015 Niemz
(Continued)

FOREIGN PATENT DOCUMENTS

DE 3913620 A1 10/1990
DE 19549216 A1 7/1997
(Continued)

OTHER PUBLICATIONS

Bruno Cernushi-Frias, et al.; "Toward a Model-Based Bayesian Theory for Estimating and Recognizing Parameterized 3-D Objects Using Two or More Images Taken from Different Positions"; published Oct. 1989; IEEE Transactions on Pattern Analysis and Machine Intelligence; pp. 1028-1052.
(Continued)

*Primary Examiner* — Congvan Tran
(74) *Attorney, Agent, or Firm* — Fitch, Even, Tabin & Flannery LLP

(57) ABSTRACT

The invention relates to a method for recognizing a raised object on the basis of images in an environmental region of a motor vehicle, comprising: capturing a first image from a first camera and a second image from a second camera, transforming the first and second images into a common reference system, forming gradients over pixel values of pixels along gradient lines in the transformed first and
(Continued)

second images, summing gradients along parallel summation lines to form a gradient sum, determining a first pair of the maxima of the gradient sum in the transformed first image and a second pair of the maxima of the gradient sum in the transformed second image, recognizing the raised object, if at least one distance between the maxima of the first pair in the transformed first image deviates from a distance of the maxima of the corresponding second pair in the transformed second image.

12 Claims, 5 Drawing Sheets

(51) Int. Cl.
  *G06T 7/70*  (2017.01)
  *B60R 11/04*  (2006.01)
  *G06K 9/62*  (2006.01)
  *G06T 7/60*  (2017.01)

(52) U.S. Cl.
  CPC ............... *G06T 7/30* (2017.01); *G06T 7/60* (2013.01); *G06T 7/70* (2017.01); *B60R 2300/607* (2013.01); *G06K 2009/6213* (2013.01); *G06T 2207/30248* (2013.01)

(58) Field of Classification Search
  CPC . G06T 7/60; G06T 2207/30248; B60R 11/04; B60R 2300/607
  USPC .......................................................... 382/104
  See application file for complete search history.

(56) References Cited

U.S. PATENT DOCUMENTS

| | | | |
|---|---|---|---|
| 2015/0332114 A1 | 11/2015 | Springer | |
| 2016/0063705 A1* | 3/2016 | Xu | H04N 5/23238 382/199 |
| 2016/0159281 A1* | 6/2016 | Jang | B60R 1/00 348/148 |
| 2019/0291642 A1* | 9/2019 | Chae | G06K 9/00791 |

FOREIGN PATENT DOCUMENTS

| | | |
|---|---|---|
| DE | 102014017904 A1 | 7/2015 |
| DE | 102015209550 A1 | 12/2016 |
| JP | 2002170103 A | 6/2002 |
| JP | 2008048345 A | 2/2008 |
| WO | 2015039776 A1 | 3/2015 |

OTHER PUBLICATIONS

Kellner Martin et al.; "Multi-cue, Model-Based Detection and Mapping of Road Curb Features Using Stereo Vision"; published Sep. 2015; 2015 IEEE 18th International Conference on Intelligent Transportation System; pp. 1221-1228; (abstract and introduction only).

Florin Oniga et al.; "Curb Detection based on Elevation Maps from Dense Stereo"; published Sep. 2007; 2007 IEEE International Conference on Intelligent Computer Communication and Processing; pp. 119-125.

PCT; App. No. PCT/EP2017/083531; International Search Report and Written Opinion dated Apr. 19. 2018.

* cited by examiner

RECOGNIZING A RAISED OBJECT ON THE BASIS OF PERSPECTIVE IMAGES

CROSS-REFERENCE TO RELATED APPLICATIONS

This application is a U.S. national phase application of International Application No. PCT/EP2017/083531, filed Dec. 19, 2017, designating the United States, which claims priority to German Patent Application No. 10 2016 124 747.2, filed on Dec. 19, 2016.

FIELD

The invention relates to a method for recognizing a raised object in an environmental region of a motor vehicle, wherein on the basis of perspective images from two different cameras of different perspectives a three-dimensional effect can be achieved. The invention moreover relates to a driver assistance device for recognizing a raised object. A third aspect of the invention relates to a motor vehicle with a driver assistance device for recognizing a raised object in an environmental region of the motor vehicle.

BACKGROUND

Known from the prior art are cameras, which capture the environment of a motor vehicle and provide it to a user, for instance on a screen. Examples herefor are rear view cameras as well as driver assistance systems, which show the environment of the motor vehicle from the bird's eye perspective. The recognition of raised objects by means of a camera, however, are not necessarily possible, since it is a two-dimensional image of the environment. In particular the differentiation of flat objects such as road markings and raised objects such as border stones is not possible. In the very case of maneuvering a motor vehicle, for instance when parking or when driving in a narrow environment, the recognition of the border stone, however, can be very important.

The US 2015/003 59 83 A1 for instance discloses a method for warning against a collision of a motor vehicle with an object, for instance a border stone, wherein a camera arranged laterally on the motor vehicle captures the border stone two-dimensionally and in the case of a possible collision with the border stone emits a warning.

In order to provide a two-dimensional image of an environment of a motor vehicle with a three-dimensional component, the WO 2015/039 776 A1 combines a camera with a distance measurement device. A calculation unit is configured to create on the basis of image data of the camera as well as on the basis of distance data of the distance measurement device a three-dimensional image impression.

The DE 10 2014 017 904 A1 relates to a method for detection of a raised object in an environment of a motor vehicle. In this connection by means of triangulation of two images of different perspective from different cameras raised objects can be determined by establishing and verifying object hypotheses.

It is the task of the present invention to provide an alternative method for recognizing a raised object on the basis of images.

SUMMARY

According to the invention this task is solved by objects of the independent patent claims. Advantageous embodiments with expedient further developments are subject matter of the dependent patent claims, the description, and the figures.

As part of the present invention for recognizing a raised object in an environmental region of a motor vehicle, to start with a first image from a first camera and a second image from a second camera are captured. By the first image and the second image the environmental region of each is at least partly imaged. In particular the environmental region is imaged at least partly by the first image and the second image each from a different perspective. The first camera and the second camera have a different perspective. Preferably the first camera and the second camera capture the environmental region from a different perspective. In particular both the first image as well as the second image at least partly image the raised object. The first image and/or the second image each can be part of an image sequence, for instance a series image or a video recording. Then the present method is performed in particular for several or all images of the respective image sequence. Thereby the recognition of the raised object is facilitated also in moved images. The first image and the second image can be an excerpt from a first entire image, which is captured by the first camera, or a second entire image, which is captured by the second camera, respectively.

The first image and the second image in a next step according to a respective predetermined transformation instruction are transformed into a common reference system. Here for from the prior art various methods are known, which can form the respective predetermined transformation instruction. By way of transformation the first image can be transformed into a first transformed image. By way of transformation the second image can be transformed into a transformed second image. The transformed first image and the transformed second image can image the environmental region of the motor vehicle each at least partly from the same perspective. In the following the first transformed image and the second transformed image are referred to as the transformed images, if both of the two images are mentioned.

In the transformed first image and the transformed second image gradients are formed over pixel values of pixels along respective gradient lines. A number of gradient lines can be adjusted to a number of columns of the respective transformed images. For instance the transformed images each have a resolution of 1024×1024 pixels, i.e. a number of columns as well as a number of rows of 1024 each. Then 1024 gradient lines can be provided. Alternatively, several columns of the respective transformed images can be combined or skipped or omitted, which leads to a smaller number of gradient lines. The respective gradient lines extend in particular in parallel to each other. The gradients can describe the course or the change of pixel values along the respective gradient lines. The pixel value can describe a brightness, a color value, or a texture of a respective pixel. Preferably the gradient describes an image gradient.

The gradients are summed along several parallel summation lines to form a gradient sum. The gradient sum can be a gradient sum function. By the gradient sum or the gradient sum function each of the several parallel summation lines can be assigned a gradient sum value, which in particular corresponds to the sum of the gradient along the respective summation lines. The summation lines and the gradient lines are perpendicular to each other. In analogy to the number of gradient lines a number of the summation lines can be adjusted to the number of rows of the respective transformed images. In the case of the resolution of 1024×1024 pixels 1024 summation lines can be provided. Alternatively several rows of the respective transformed images can be combined or skipped or omitted, which leads to a smaller number of summation lines. Maxima of the gradient sum represent in particular an edge in the respective transformed image, which is at least essentially orientated in parallel to the several parallel summation lines. Preferably the maxima of the gradient sum represent boundaries or edges of the raised object.

In a next step a first pair of maxima of the gradient sum in the transformed first image is determined and a second pair of maxima of the gradient sum in the transformed second image is determined. The pairs correspond with each other according to a predetermined criterion. For instance as those maxima for the first pair of the gradient sum in the transformed first image the two largest maxima of the gradient sum in the transformed first image are determined. For instance as those maxima for the second pair of the gradient sum in the transformed second image the largest maxima of the gradient sum in the transformed second image are determined. The pairs can then correspond with each other according to the predetermined criterion with each other in such a way that these are the sharpest edges of the respective transformed images. Alternatively or additionally the maxima of the respective transformed images can be numbered consecutively according to a predetermined order, for instance from top to bottom, wherein each maximum is assigned a number. For instance the top maximum of each image is given the number 1. The pairs can then correspond according to a predetermined criterion with each other in such a way that their maxima are assigned the same number. Preferably those maxima can be determined according to a predetermined criterion for the respective pairs, which represent the same boundaries of the raised object in the respective transformed image.

The raised object can then be recognized, if a distance between the maxima of the first pair in the transformed first image deviates from a distance of the maxima of the corresponding second pair in the transform second image. In the transformation of the first image and the second image into the common reference system perspective distortions may occur in the raised object. This is due to the different perspectives of the first camera and the second camera and/or by the different perspectives of the first image and the second image. In particular the boundaries of the raised object can have different relative distances in the transformed first image and the transformed second image. In the case of a flat object, e.g. a road marking, in particular no perspective distortions occur and/or the boundaries of the flat object have different relative distances in the transformed images. As the maxima of the gradient sum represent the boundaries of the raised object and the first and the second pair correspond with each other according to the predetermined criterion, on the basis of the deviating distance between the first pair and the second pair it can be concluded, that an object is a raised object. In this way an alternative method for recognizing a raised object can be provided.

Instead of determining pairs of maxima, the gradient sums can be evaluated by forming (x) a progression of difference from the gradient sum of the transformed first image and the gradient sum of the transformed second image. For instance the gradient sum of the transformed first image can be deducted from the gradient sum of the transformed second image. In particular the gradient sums of the transformed images can be deducted in a section, where the raised object is located. Alternatively or additionally a modulus of the difference of the gradient sums can be formed as the progression of difference.

The raised object can be determined (xi), when the progression of difference or an integral over the progression of difference exceeds a predetermined threshold value. For instance the raised object is determined when the absolute difference of the gradient sums exceeds the predetermined threshold value in a single point of the course of the progression of difference. Alternatively or additionally an integral over the progression of difference can be formed. The integral characterizes the area beneath the progression of difference. If the integral has a value bigger than the predetermined threshold value or a further predetermined threshold value the raised object can be determined.

As the maxima of the respective gradient sum of the transformed images can have a deviating distance from each other if they represent the raised object, the progression of difference can exceed the predetermined threshold value. The maxima are not fully subtracted from each other. In case of a flat object the maxima of the respective gradient sums of the transformed images can have the same distance from each other, what can result in a flat progression of difference, as the maxima are subtracted from each other.

If the transformed images are shifted in the common reference system, a flat object can falsely result in a progression of difference which exceeds the predetermined value. Therefore the gradient sum of the transformed images can be aligned to each other before forming the progression of difference. For instance one of the gradient sums can be shifted in a predetermined range parallel to the gradient lines. The progression of difference can be formed for different positions of the shifted gradient sum. For the value of shifting which results in the lowest progression of difference and/or integral of the progression of difference the gradient sums can be determined as optimal aligned. If the progression of difference or the integral of the progression of difference exceeds the predetermined threshold value anyway, the raised object can be determined.

In a further development of the invention the first image and the second image are transformed into a bird's eye perspective as common reference system. The bird's eye perspective can show the motor vehicle and the environmental region from the top. Such a bird's eye perspective is also referred to as top view. The images transformed into the bird's eye perspective can be provided to a driver of the motor vehicle on a monitor of the motor vehicle upon recognition of the raised object.

In a further development of the invention a border stone is recognized as the raised object. In particular it is recognized whether the object is a flat object, for instance a road marking, or a raised object, for instance a border stone. In this way the driver of the motor vehicle can be provided with a particularly advantageous driver assistance system.

In a further embodiment of the invention it is envisaged that the raised object is assigned a height. The height of the raised object can be assigned to same for instance on the basis of a position of the raised object, in particular relative to the motor vehicle, as well as the relation of the distances of the first pair and the second pair of the maxima. For instance, if its position is in a predetermined position area and the relation of the maxima of the first pair and the second pair is within a predetermined interval, a predetermined height value for the height is assigned to the raised object. Alternatively or additionally the height can be assigned to the raised object by way of calculation. For instance the height value for the raised object calculated on the basis of the transformed images as well as on the basis of perspective information, in particular a position of the first camera, a position of the second camera, and the position of the raised object. For instance the calculation can be effected by means of triangulation. On the basis of the height it can for instance be determined whether the motor vehicle can drive over the raised object or not.

A further development of the invention envisages that an overlapping region of the environmental region is imaged by the first image and by the second image and the raised object is recognized at least partly within the overlapping region. In other words, the first image and the second image as well as the first transformed image and the second transformed image image the overlapping region of the environmental region. The raised object can be within this overlapping region. Accordingly, the raised object can be imaged both by the first image as well as by the second image and/or both by the transformed first image as well as by the transformed second image. The first image and the second image can image the raised object, in particular a partial area of the raised object, from a respective different perspective. By transforming the first image and the second image into the transformed first image and the transformed second image, which can have the same perspective, perspective distortions occur at the raised object. In the overlapping region the raised object accordingly can be recognized on the basis of deviating distances between the maxima of the first pair and the corresponding second pair, wherein the maxima in particular represent the same boundaries of the raised object in the same partial area of the raised object.

In further development it is envisaged that a further overlapping region of the environmental area is imaged by a further first image from a further first camera and a further second image from a further second camera and the raised object between the overlapping region and the further overlapping region is recognized by interpolation between the overlapping region and the further environmental region. In other words, the raised object is recognized by means of the method according to the invention in the overlapping region and in the further overlapping region, in particular independently of each other. Preferably the raised object extends both over the overlapping region as well as over the further overlapping region. The overlapping region and the further overlapping region are in particular separate from each other, wherein between the overlapping region and the further overlapping region preferably an intermediate area. The intermediate area has in particular a finite expansion. Preferably the overlapping region and the further overlapping region have a finite distance from each other, for instance at least 10 cm, 50 cm, 100 cm, or 200 cm. The intermediate area is imaged in particular by the first image and/or the second image and or a further image of a further camera. Therefore the raised object in the intermediate area cannot be recognized easily. If the raised object extends at least partly over the intermediate area, the overlapping region, and the further overlapping region, the raised object can be recognized by interpolation between the overlapping region and the further overlapping region also in the intermediate area, i.e. between the overlapping region and the further overlapping region. If the raised object is recognized both in the overlapping region as well as in the further overlapping region, it can be assumed that the raised object is also raised in the intermediate area. For instance a border stone, which extends over the overlapping region and the further overlapping region and is recognized both in the overlapping region and in the further overlapping region as raised object, is also recognized in the intermediate area as raised object.

A further development of the invention envisages that the raised object is recognized by extrapolation of the first image and/or the second image in a partial area of the environmental region, which is imaged maximally by the first or the second image. Alternatively or additionally, the raised object can be recognized by extrapolation of the transformed first image and/or the transformed second image in a partial area of the environmental region, which is imaged maximally by the first or the second image. In particular the first image or the transformed first image and7or the second image or the transformed second image is extrapolated to the effect that a virtual overlapping region forms, which in particular comprises the partial area of the environmental region. The virtual overlapping region can be imaged by the (transformed) first image and an extrapolated (transformed) second image or by the (transformed) second image and an extrapolated (transformed) first image or by the extrapolated (transformed) first image and the extrapolated (transformed) second image. Preferably a representation of the raised object, preferably of its boundaries, is extrapolated for the respective extrapolated (transformed) image. In other words, by extrapolation of the (transformed) first image and/or the (transformed) second image (transformed) images of the partial area of the environmental region with different perspective are generated. Thereby a still more comprehensive recognition of the raised object in the environmental region of the motor vehicle is facilitated.

In further development of the invention for determining the gradient sum to start with a main orientation direction of the raised object is recognized and the gradient lines orientated perpendicular to the main orientation direction of the raised object. For example the transformed image, in particular the first transformed image and/or the second transformed image, may be rotated to orient the gradient lines perpendicular to the main orientation direction of the raised object. In this case the gradient lines may have a fixed orientation. Alternatively a 2-D gradient vector can be computed at each pixel and be projected on a histogram axis, which is rotated to be perpendicular to the main orientation of the image computed earlier. The main orientation direction of the raised object can be determined in a simple way by means of an image analysis method as it is known from the prior art. In particular the main orientation direction of the raised object extends in parallel to the boundaries of the raised object. The boundaries can be well recognized on the basis of the maxima of the gradient sum, if the gradient is formed along gradient lines extending perpendicular to the boundaries of the raised object, or the gradient sum is formed by summation lines extending in parallel to the boundaries.

A second aspect of the invention relates to a driver assistance device for recognizing a raised object in an environmental region of a motor vehicle. The driver assistance device is configured for performing a method of the above-named kind.

A third aspect of the invention relates to a motor vehicle with a driver assistance device for recognizing a raised object in an environmental region of the motor vehicle. The motor vehicle has a first camera for capturing a first image and a second camera for capturing a second image. The first camera and the second camera are configured for imaging or capturing the environmental region by the first image and the second image each at least partly. The second camera has a perspective that is different from the first camera. In particular the first camera and the second camera capture the environmental region from a different perspective. In particular the first camera and the second camera are arranged in different positions on the motor vehicle. A geometry unit of the motor vehicle or the driver assistance device is configured for transforming the first image and the second image into a common reference system according to a respective predetermined transformation instruction.

The motor vehicle or the driver assistance device comprises a computing unit for forming gradients over pixel values of pixels along respective gradient lines in the transformed first image and the transformed second image. The computing unit is configured in addition for summing the gradient along several parallel summation lines to form a gradient sum. In this connection the summation lines and the gradient lines are perpendicular to each other. Maxima of the gradient sum represent boundaries of the raised object. Further, the computing unit is configured for determining a first pair of maxima of the gradient sum in the transformed first image and the second pair of the maxima of the gradient sum in the transformed second image. In this connection the pairs correspond with each other according to a predetermined criterion. The computing unit is configured for recognizing the raised object, if at least one distance between the maxima of the first pair in the transformed first image deviates from a distance of the maxima of the corresponding second pair in the transformed second image.

Advantageous embodiments and expedient further developments of the method according to the invention apply in analogy also to the driver assistance device according to the invention and the motor vehicle according to the invention.

Further features of the invention are apparent from the claims, the figures and the description of figures. The features and feature combinations mentioned above in the description as well as the features and feature combinations mentioned below in the description of figures and/or shown in the figures alone are usable not only in the respectively specified combination, but also in other combinations without departing from the scope of the invention. Thus, implementations are also to be considered as encompassed and disclosed by the invention, which are not explicitly shown in the figures and explained, but arise from and can be generated by separated feature combinations from the explained implementations. Implementations and feature combinations are also to be considered as disclosed, which thus do not have all of the features of an originally formulated independent claim. Moreover, implementations and feature combinations are to be considered as disclosed, in particular by the implementations set out above, which extend beyond or deviate from the feature combinations set out in the relations of the claims.

BRIEF DESCRIPTION OF THE DRAWINGS

These show in.

DESCRIPTION OF THE PREFERRED EMBODIMENTS

Figure 1:
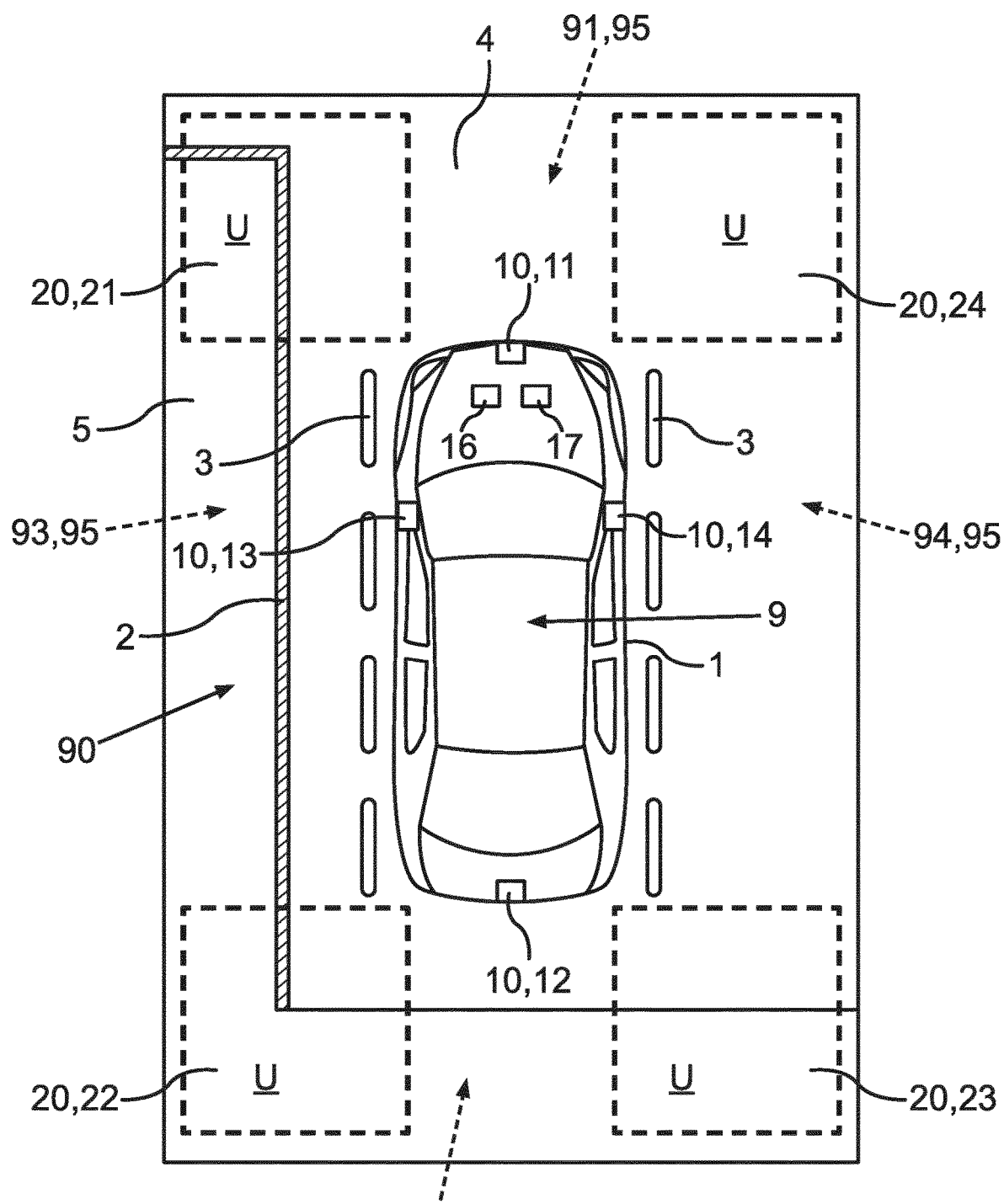
FIG. 1 schematically a motor vehicle from a bird's eye perspective, wherein several cameras of the motor vehicle have overlapping regions, FIG. 2 a schematic front view of a motor vehicle with two cameras, which capture a raised object from different perspectives, FIG. 3 transformed images from a front camera and a rear camera of a motor vehicle, FIG. 4 transformed images from a left lateral camera and a right lateral camera of a motor vehicle, as well as FIG. 5 a schematic overview of two different progressions of difference.

FIG. 1 shows a motor vehicle 1 with several cameras 10 each capturing or imaging an environmental region of the motor vehicle at least partly. Each of the cameras 10 has a respective capture range 95. The cameras 10 can for instance have a capture angle of 180°. The respective cameras 10 can overlap in their capture range 95, in the present case overlapping regions 20 are captured of two cameras 10 each. In the present case the motor vehicle comprises a front camera 11, a rear camera 12, a left lateral camera 13, in particular on a left external mirror of the motor vehicle 1, as well as a right lateral camera 14, in particular on a right external mirror of the motor vehicle 1. Each of the cameras 10 can represent a first camera or a second camera in the sense of the invention, wherein different cameras 10 have to represent the first camera and the second camera. Preferably the cameras 10, which embody the first camera and the second camera, have an overlapping region 20.

A capture range 91 of the front camera 11 and a capture range 93 of the left lateral camera 13 have an overlapping region 21, the capture range 91 of the front camera 11 and a capture range 94 of the right lateral camera 14 have an overlapping region 24, a capture range 92 of the rear camera 12 and the capture range 93 of the left lateral camera 13 have an overlapping region 22 and the capture range 92 of the rear camera 12 as well as the capture range 94 of the right lateral camera 14 have an overlapping range 23. The overlapping regions 20 can in particular occur in the marginal regions of a fish exe lens of the cameras 10 and can therefore have a lower resolution in comparison with a center of the capture area. Since each of the overlapping regions 20 are captured or imaged by two cameras 10 in respective images from different perspectives, by means of the present method spatial information about the environmental region U can be extracted from the images of the cameras 10.

The cameras 10 can be part of a driver assistance 9 system of the motor vehicle 1, which represent the motor vehicle 1 and an environment of the motor vehicle 1, in particular the environmental regions U, on a screen of the motor vehicle 1, from a bird's eye perspective. This can be a system referred to as "surround-view" with four cameras 10. The representation on the screen can for instance essentially correspond to FIG. 1. The motor vehicle 1 is on a roadway 4, for instance a street or a parking area. On the roadway 4 there are flat objects 3 arranged, for instance road markings. The roadway 4 in the present case is for instance separated at least partly by a raised object 2, for instance a border stone, from a restricted area 5, for instance a pavement or a grass verge. In particular by the driver assistance system 9 the raised object 2 is to be recognized and preferably be differentiated from the flat object 3, in particular the road marking. Alternatively or additionally the driver assistance system 9 can provide data or information for a, at least partially, autonomous driving of the motor vehicle 9.

The raised object 2, the flat object 3, the roadway 4, and the restricted area 5 can represent areas of interest to the driver of the motor vehicle 1 or to the driver assistance system 9. Areas of interest are frequently referred to as "region of interest".

Figure 2:
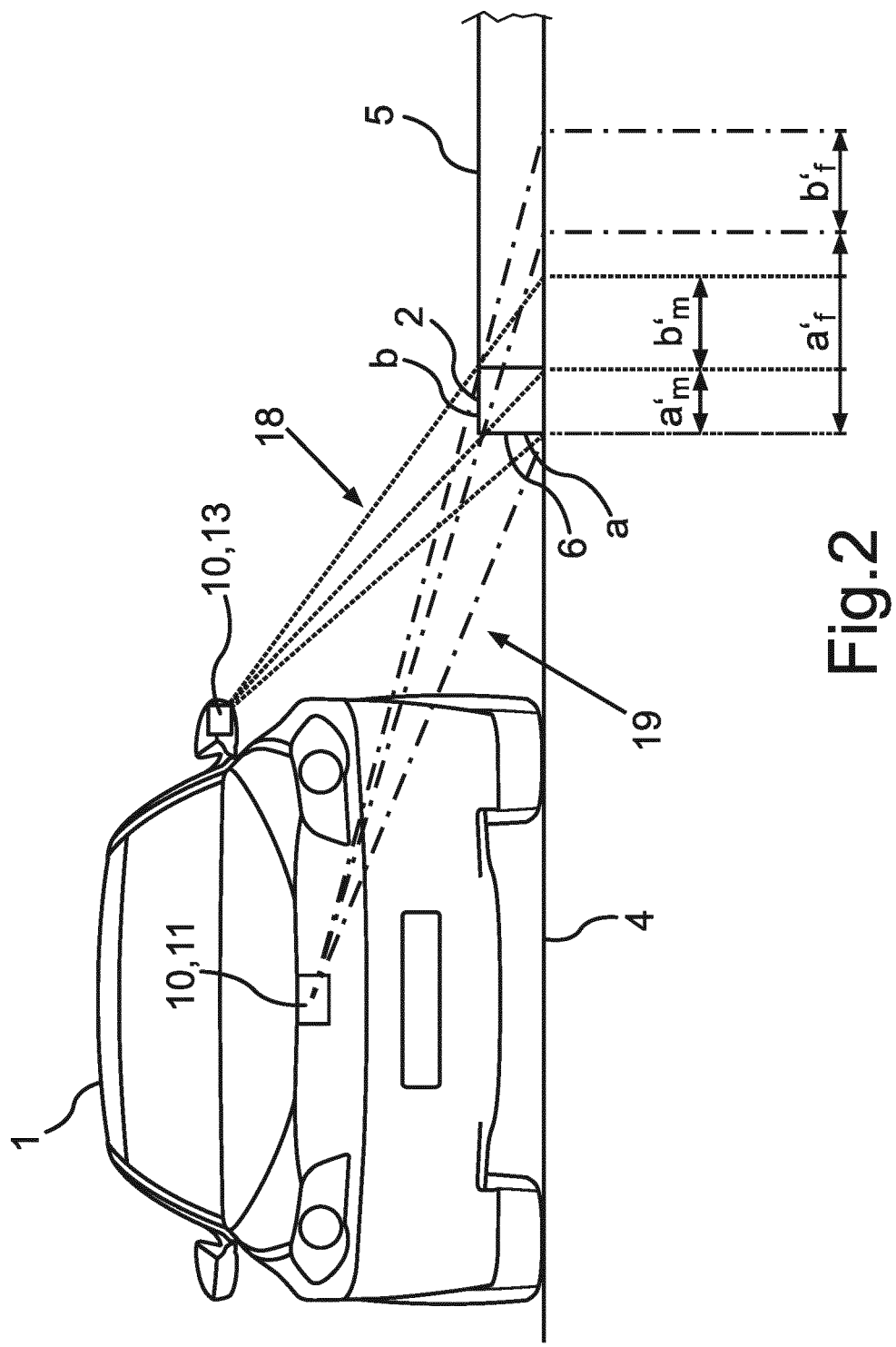

FIG. 2 shows the motor vehicle 1 on the roadway 4 in the vicinity of the raised object 2. The raised object 2 presently is captured by the left lateral camera 13 and the front camera 11. Auxiliary lines 18, 19 are meant to illustrate how the raised object 2 can be distorted in perspective by the different perspectives of the front camera 11 and the left lateral camera 13. This phenomenon is also referred to as parallax. In particular a horizontal expansion b of the raised object 2 as well as a vertical expansion a of the raised object 2 or a lateral surface 6 of the raised object 2 is distorted in perspective. From the perspective of the left lateral camera 13 the vertical expansion a corresponds to the expansion a'm, and the horizontal expansion b to the expansion b'm. From the perspective of the front camera 11 the vertical expansion a corresponds to the expansion a'f and the horizontal expansion b to the expansion b'f. In this connection the expansion b'm and the expansion b'f are similar and in particular approximately identical. Due to the perspective given conditions the expansion a'm and the expansion a'f are clearly different. Due to this perspective distortion the raised object 2 can be recognized.

From the cameras 10 respective images of the environmental region U are captured. These images image the environmental region U or the overlapping region 20 from different perspectives or represent the environmental region U or the overlapping regions 20 from different perspectives. In particular these images from cameras 10 are captured for instance by a geometry unit 16. By the geometry unit 16 the images are transformed into a common reference system according to a respective predetermined transformation instruction. In the present case the images are transformed into the bird's eye perspective as common reference system. Generally, however, a transformation into any random common reference system or any random perspective is possible. For instance the images of all cameras 10 rather than into the bird's eye perspective can be transformed into the perspective of the left lateral camera 13. By the transformation transformed images 7 are obtained. The following steps of the present method can be performed by a calculation unit 17 of the motor vehicle.

Figure 3:
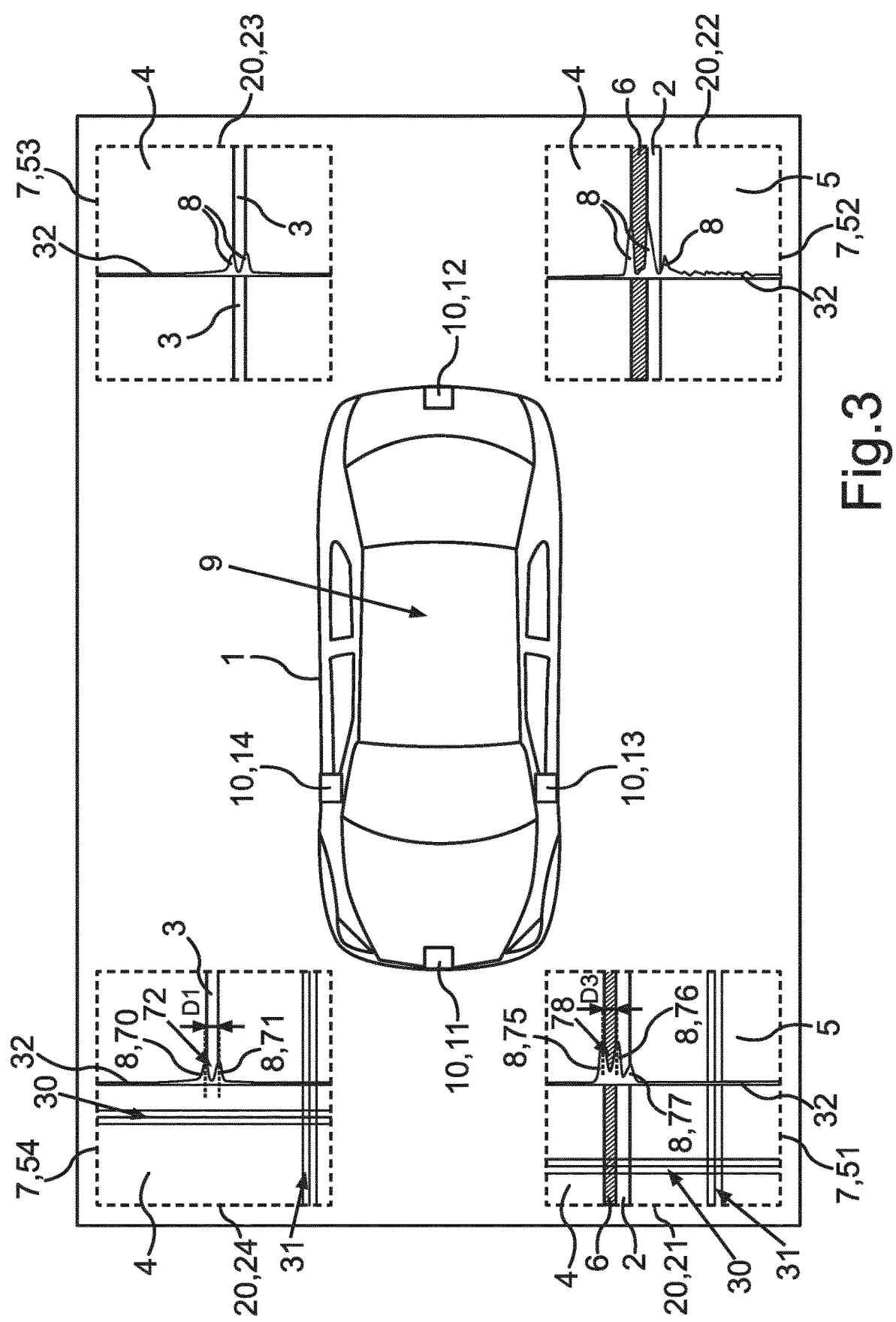
Figure 4:
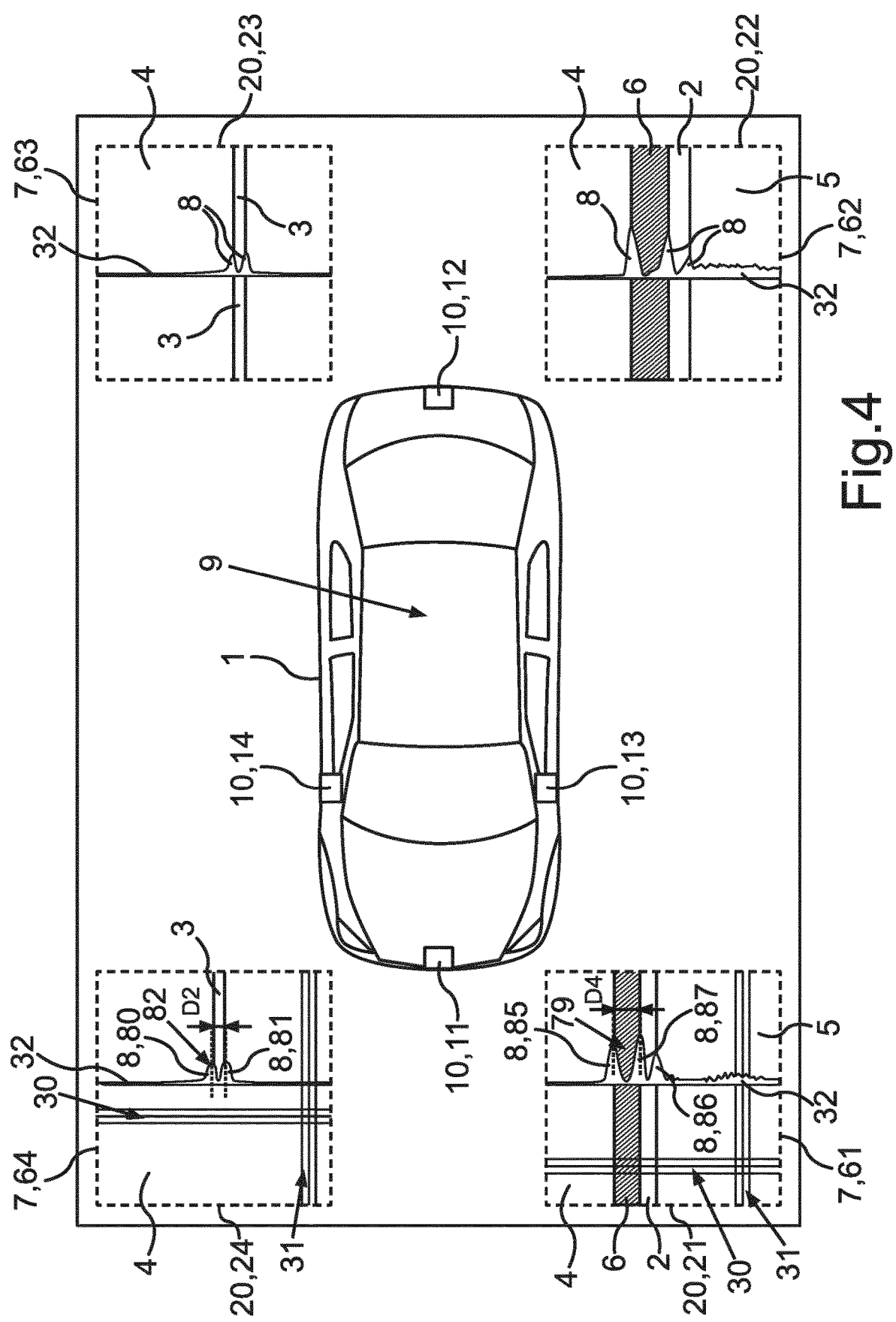

FIG. 3 and FIG. 4 show transformed images 7 of exemplary overlapping regions 20, represented in a similar way as in FIG. 1. In this connection the transformed images 7 in FIG. 2 show overlapping regions 20 from the perspective of the left lateral camera 13 as well as the right lateral camera 14 and the transformed images 7 in FIG. 4 show the overlapping regions 20 from the perspective of the front camera 10 and the rear camera 12. The transformed image 54 images the overlapping region 24 from the perspective of the right lateral camera 14, the transformed image 53 images the overlapping region 23 from the perspective of the right lateral camera 14, the transformed image 52 images the overlapping region 22 from the perspective of the left lateral camera 13 and the transformed image 51 images the overlapping region 21 from the perspective of the left lateral camera 12. The transformed image 64 images the overlapping region 24 from the perspective of the front camera 11, the transformed image 61 images the overlapping region 21 from the perspective of the front camera 11, the transformed image 63 images the overlapping region 23 from the perspective of the rear camera 12. In each case it can be recognized well that the respective transformed images 7, which image the same overlapping region 20 from different perspectives of different cameras 10, in particular apart from perspective distortions, look similar or alike. For instance the transformed image 51 and the transformed image 61 of the overlapping region 21 are very similar apart from perspective distortions.

In an example the left lateral camera 13 is the first camera and the front camera 11 is the second camera. In this example both the first image as well as the second image image the overlapping region 21. The first image is transformed into the first image, which in this example corresponds to the transformed image 51. The second image is transformed into the second image, which in this example corresponds to the transformed image 61. In the first transformed image 51 and the second transformed image 61 along gradient lines 30 a gradient is formed over pixel values of pixels along the respective gradient lines 30. The number of gradient lines 30 corresponds in particular to a number of columns of the respective transformed image 51, 61. For instance the transformed images 51, 61 have a resolution of 1024×1024, which results in a number of columns of 1024. The pixel values, over which the gradient is formed, is in particular a brightness or a luminance, a color value, or a texture value. In the present case the gradient is formed over the brightness or the luminance and accordingly indicates a change in brightness along a respective gradient line 30.

In a next step the gradients along the summation lines 31 are summed. The summation lines 31 in this connection are perpendicular to the gradient lines 30. The number of summation lines 31 can in particular be adjusted to the number of rows/lines of the transformed image 51, 61 and in the present case amounts to 1024. Thus 1024 gradient lines 30 and 1024 summation lines 31 are given. Each of the summation lines 31 intersects each of the gradient lines 30 exactly once. In the intersections of respective summation lines 31 with each of the gradient lines 30 gradient values are given. Along each of the summation lines 31 those gradient values are summed. Thus the number of summands along the summation lines 31 corresponds exactly to the number of gradient lines 30. The sum of all gradient values along one of the summation lines 31 corresponds exactly to the number of the gradient lines 30. The sum of all gradient values along one of the summation lines 31 corresponds to a gradient sum value of the respective summation lines 31. A gradient sum 32 in the present case corresponds to the vertical extension of the gradient sum values. The gradient sum 32 can be referred to as a histogram, particularly of the gradient values.

When summing the individual gradient values along the summation lines 31 for instance the individual gradient values can be summed or an amount of the individual gradient values be summed or a square of the individual gradient values be summed. If the square of the individual gradient values is summed, the gradient values to start with are squared in the first place. Subsequently the gradient sum value can be formed for instance by the root of the squared and summed gradient values. The gradient lines and sum lines are depicted in excerpts only in FIG. 3 and FIG. 4. As a matter of form only three lines each are depicted.

The gradient sum 32 can have several maxima 8. The maxima 8 in this connection can represent the boundaries of the raised object 2. In the present case in the transformed first image 51 and the transformed second image 61 a maximum 75, 85 each represents a boundary be between the roadway 4 and the lateral surface 6 of the raised object 2. A maximum 76, 86 each represents a boundary between the lateral surface 6 and the top surface of the raised object 2. A maximum 77, 87 each represents a boundary between the top surface of the raised object 2 and the restricted area 5. The maximum 75 in the transformed first image 51 and the maximum 85 in the transformed second image 61 correspond, the maximum 76 in the transformed first image 51 and the maximum 86 in the transformed second image 61 correspond, and the maximum 77 in the transformed first image 51 and the maximum 87 in the transformed second image 61 correspond, since these named maxima 75, 85, 76, 86, 77, 87 each represent the same boundary of the raised object 2.

With reference to FIG. 2 a distance D3 between a maximum 75 and the maximum 76 in image 51 corresponds to the expansion a'm and a distance D4 between the maximum 85 and the maximum 86 in image 51 corresponds to the expansion a'f.

The corresponding maxima 75, 85, 76, 86, 77, 87 in the transformed first image 51 and the transformed second image 61 can be selected by means of a predefined criterion. For example the maxima 75, 85, 76, 86, 77, 87 are selected on the basis of their maximum value as corresponding. Alternatively or additionally, the maxima 75, 85, 76, 86, 77, 87 can for instance be numbered consecutively from the top downwards and each of the maxima 75, 85, 76, 86, 77, 87 be assigned a number. For instance in this case in each case the top maximum 75 in the transformed first image 51 corresponds to the top maximum 85 in the transformed second image 61 and the second maximum 76 in the transformed first image 51 to the second maximum 86 in the transformed second image 61. From each of the maxima 75, 85, 76, 86, 77, 87 respective corresponding pairs 78, 79 can be determined. For instance all possible pairs amongst the maxima 75, 85, 76, 86, 77, 87 are determined. Particularly exactly those pairs 78, 79 correspond, which consist of maxima 75, 76, 77 corresponding in the transformed first image 51 and the transformed second image 61.

Alternatively or additionally according to the predefined criterion not the individual maxima 75, 76, 77 are selected as corresponding, but the two highest maxima 75, 76 in the transformed first image 51 and the transformed second image 61 are selected as corresponding. The two highest maxima 75, 76 in the first transformed image 51 can be determined as the first pair 78. The two highest maxima 85, 86 in the transformed further image 61 can be determined as the corresponding second pair 79. Accordingly, in this case not the corresponding maxima 75, 76, but the corresponding pairs 78, 79 are determined.

The raised object 2 is then recognized, if a distance D3 between the maxima 75, 76 of the first pair 78 in the transformed first image 51 deviates from a distance D4 between the maxima 85, 86 of the second pair 79 in the transformed second image 61. The distance D3 in particular corresponds to the expansion a'm in FIG. 2 and the distance D4 corresponds in particular to the expansion al in FIG. 2. Accordingly the raised object 2 can be recognized by analyzing the maxima 8 of the gradient sum 32, wherein the maxima 8 represent the boundaries of the raised objects 2.

Alternately or additionally a height can be assigned to the raised object 2. The height of the raised object 2, in FIG. 2 represented by the expansion a, can be assigned to same for instance on the basis of a position of the raised object 2, in particular a relative position to the motor vehicle, as well as the relation of the distances D3, D4 of the first pair 78 and the second pair 79 of the maxima 75, 85, 76, 86. Present the height can be assigned to the raised object 2 by way of calculation. Present a height value for the raised object 2 is calculated on the basis of the transformed images 51, 61, particular the relation of the distances D3, D4, as well as on the basis of a position of the front camera 11, a position of the left lateral camera 13, and the position of the raised object 2. For instance the calculation can be effected by means of triangulation. On the basis of the height it can for instance be determined whether the motor vehicle 1 can drive over the raised object 2 or not.

In the case of a comparable analysis for the overlapping region 24 on the basis of transformed images 54, 64 a first pair 72 of maxima 70, 71 in the transformed image 54 and a second pair 82 of maxima 80, 81 in the transformed image 64 is determined. A distance D1 between the maxima 70, 71 of the first pair 72 and a distance D2 between the maxima 80, 81 of the second pair 82 is presently equal. Therefore a flat object 3 can be assumed, since no perspective distortion occurs.

In order to recognize the raised object 2 in an environmental region U, which is no overlapping region 20 of two cameras 10, an extrapolation of the capture range 95 of the cameras 10 can be effected. In an example, which is not shown, the front camera 11 and the left lateral camera 13 have no overlapping region 20. The raised object 2 can for instance be captured both by the front camera 11 as well as by the left lateral camera 13. By an extrapolation of the extension of the raised object 2 such virtual overlapping region can be generated. In this virtual overlapping region the present method can be performed.

In further development of the invention in an intermediate area 90 between the overlapping region 21 and the overlapping region 22 the raised object 2 can be recognized by interpolation between the overlapping region 21 and the overlapping region 22. The raised object 2 is recognized both in the overlapping region 21 and in the overlapping region 22 is recognized as raised object. The intermediate area 90 is in particular in the capture range 93 of the left lateral camera 13. The left lateral camera 13 captures the raised object 2 presently in the intermediate area 90. Since it is known that the raised object 2 is both in the overlapping region 21 as well as in the overlapping region 22, it can be concluded that the raised object 2 is also in the intermediate area 90 a raised object.

For determining the gradient sum 32 it is envisaged that by means of an image analysis method a main orientation direction of the raised object 2 is determined. The gradient lines 30 can then be orientated perpendicular to the main orientation direction of the raised object 2. The summation lines 31 can be aligned in parallel to the boundaries of the raised object 2. For example the transformed images, in particular the transformed first image 51 and/or the transformed second image 61, may be rotated to orient the gradient lines 30 perpendicular to the main orientation direction of the raised object 2. In this case the gradient lines may have a fixed orientation. Image analysis methods for recognizing the main orientation direction of the raised object 2 are known from the prior art. For instance the dominant orientation of a transformed image patch, for example a transformed image patch of one or both of the transformed images 51, 61 that shows the raised object 2, can be computed by analyzing the distribution of pixel intensities within this transformed image patch with methods known from prior art. An example for such a method is given by analyzing eigenvalues and eigenvectors of a structure tensor (also referred to as second-moment matrix) of the transformed image patch or similarly by analyzing the eigenvalues and eigenvectors of a covariance matrix formed by second order central moments of the transformed image patch or by locating a maximum value in a histogram of gradient orientations of the transformed image patch.

Figure 5:
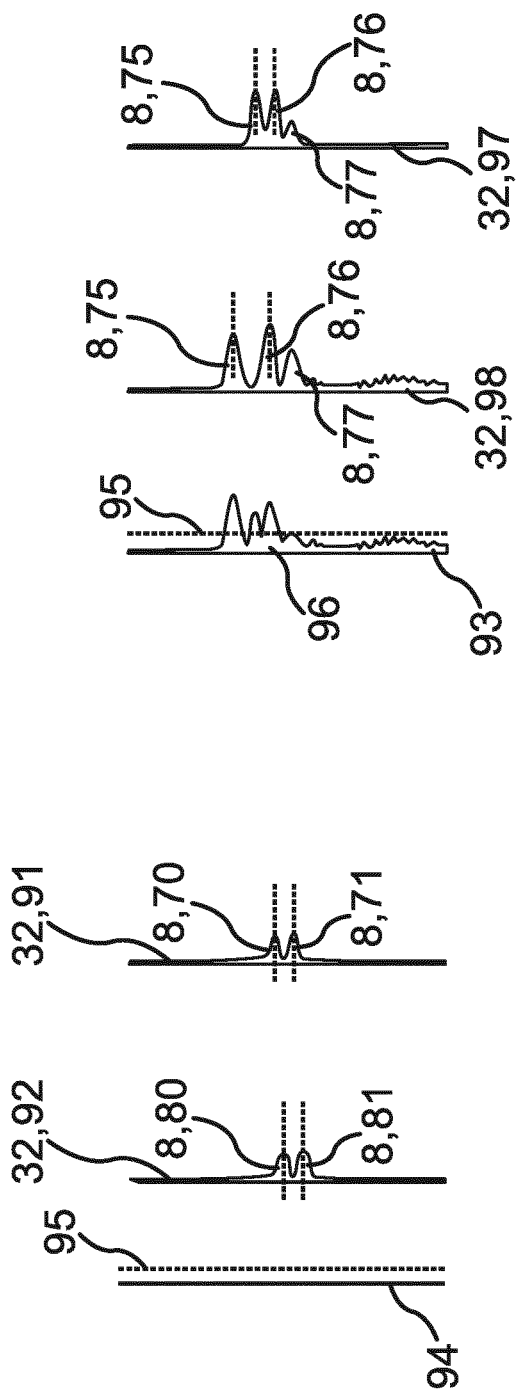

Alternatively or in addition to the analysis of the distances D3, D4 between the maxima 75, 85, 76, 86 the raised object 2 can be determined by subtracting the gradient sum 97 of the transformed first image 51 and the gradient sum 98 of the transformed second image 61. A progression of difference 93 may result, which describes the difference of the gradient sum 97 of the transformed first image 51 and the gradient sum 98 of the transformed second image 61. FIG. 5 shows schematically the evaluation by means of the progression of difference 93 and/or an integral 96 over the progression of difference 93. Present the gradient sum 97 of the transformed first image 51 is subtracted from the gradient sum 98 of the transformed second image 61 and the progression of difference 93 is formed by the absolute values of the difference. The integral 96 can represent a size of the area under the progression of difference 93.

According to FIG. 5 the progression of difference 93 exceeds a predetermined threshold value 95 in at least one point. The integral 96 over the progression of difference 93 exceeds a predetermined integral threshold value. So it can be assumed that a three-dimensional structure, i.e. the raised object 2, is given. Then the raised object 2 can be recognized. It can either be determined if the difference 93 exceeds a predetermined threshold value 95 in at least one point or if the integral 96 over the progression of difference 93 exceeds a predetermined integral threshold value. One of both can be sufficient to determine the raised object 2.

Present the gradient sum 91 of the transformed first image 54 is subtracted from the gradient sum 92 of the transformed second image 64 and the progression of difference 94 is formed by the absolute values of the difference. In that case the transformed image 54 and the transformed image 64 a very flat progression of difference 94 is given, which invariably remains below the predetermined threshold value 95. Therefore the flat object 3 can be recognized.

In order to compensate for errors in a calibration or in the capture, it may be envisaged to align the progression of the gradient sums 97, 98 of the transformed first image 51 and the transformed second image 61 with each other before the progression of the difference 93 is formed. For instance the two gradient sums 97, 98 in the respective images 51, 61 are aligned with each other by comparison of positions of the maxima 8 or by minimizing the integral 96 under the progression of difference 93. Therefore the gradient sums 97, 98 of the transformed images 51, 61 can be aligned to each other before forming the progression of difference 93. For instance one of the gradient sums 97, 98 can be shifted in a predetermined range parallel to the gradient lines 30. The progression of difference 93 can be formed for different positions of the shifted gradient sum. For the value of shifting which results in the lowest progression of difference 93 and/or integral 96 of the progression of difference 93 the gradient sums 97, 98 can be determined as optimal aligned.

Also a combination of the various analysis methods is possible. The above method can easily be adopted to real-world conditions, e.g. with water on a lens of a camera 10, significant errors in the calibration, non-flatness of the roadway 4, by the alignment.

On the whole, by the embodiment it is shown how an alternative method for recognizing a raised object on the basis of images is provided. In particular the present method in comparison with the prior art is particularly simple and can be performed with little computing effort required.

The invention claimed is:

1. A method for recognizing a raised object in an environmental region of a motor vehicle, comprising the steps:
  capturing a first image from a first camera and a second image from a second camera with a perspective that is different from the first camera, wherein the environmental region is imaged by the first image and the second image each at least partly,
  transforming the first image and the second image into a common reference system according to a respective predetermined transformation instruction,
  forming gradients over pixel values of pixels along respective gradient lines in the transformed first image and the transformed second image,
  summing gradients along several parallel summation lines to form a respective gradient sum for the transformed first image and the transformed second image, wherein the summation lines and the gradient lines are perpendicular to each other and maxima of the gradient sum represent boundaries of the raised object,
  determining a first pair of the maxima of the gradient sum in the transformed first image and a second pair of the maxima of the gradient sum in the transformed second image, wherein the pair according to a predetermined criterion correspond with each other,
  recognizing the raised object, if at least one distance between the maxima of the first pair in the transformed first image deviates from a distance of the maxima of the corresponding second pair in the transformed second image.

2. The method according to claim 1,
wherein
  the first image and the second image are transformed into a bird's eye perspective as the common reference system.

3. The method according to claim 1,
wherein
  as the raised object, a border stone is recognized.

4. The method according to claim 1,
wherein
  the raised object is assigned a height.

5. The method according to claim 1,
wherein
  an overlapping region of the environmental region is imaged by the first image and the second image, and the raised object is recognized at least partly within the overlapping region.

6. The method according to claim 5,
wherein
  a further overlapping region of the environmental region is imaged by a further first image from a further first camera and a further second image from a further second camera and the raised object is recognized by interpolation between the overlapping region and the further overlapping region.

7. The method according to claim 1,
wherein
  the raised object is recognized by extrapolation of the first image and/or the second image in a partial portion of the environmental region, which is imaged by maximally the first or the second image.

8. The method according to claim 1,
wherein
  for determining the gradient sum to start with a main orientation direction of the raised object is recognized and the gradient lines are aligned perpendicular to the main orientation direction of the raised object.

9. A driver assistance device for recognizing a raised object in an environmental region of a motor vehicle, which is configured to perform the method according to claim 1.

10. A motor vehicle with a driver assistance device for recognizing a raised object in an environmental region of the motor vehicle, configured for performing the method according to claim 1, comprising:

a first camera capturing a first image and a second camera with a perspective that is different from the first camera for capturing a second image, wherein the cameras are configured to image the environmental region by the first image and the second image each at least partially, a geometry unit for transforming the first image and the second image into a common reference system according to the respective predetermined transformation instruction, a calculation unit for forming a gradient over pixels along respective gradient lines in the transformed first image and the transformed second image, for summing the gradients along several parallel summation lines to form a respective gradient sum for the transformed first image and the transformed second image, wherein the summation lines and the gradient lines are perpendicular to each other and maxima of the gradient sums represent boundaries of the raised object, for determining a first pair of the maxima of the gradient sum in the transformed first image and a second pair of maxima of the gradient sum in the transformed second image, wherein the pairs according to a predetermined criterion correspond with each other, and for recognizing the raised object, if at least a distance between the maxima of the first pair in the transformed first image deviates from a distance of the maxima of the corresponding second pair in the transformed second image.

11. A method for recognizing a raised object in an environmental region of a motor vehicle, comprising the steps:

capturing a first image from a first camera and a second image from a second camera with a perspective that is different from the first camera, wherein the environmental region is imaged by the first image and the second image each at least partly, transforming the first image and the second image into a common reference system according to a respective predetermined transformation instruction, forming gradients over pixel values of pixels along respective gradient lines in the transformed first image and the transformed second image, summing gradients along several parallel summation lines to form a respective gradient sum for the transformed first image and the transformed second image, wherein the summation lines and the gradient lines are perpendicular to each other and maxima of the gradient sum represent boundaries of the raised object, forming a progression of difference from the gradient sum of the transformed first image and the gradient sum of the transformed second image, determining the raised object, when the progression of difference and/or the integral over the progression of difference exceeds a predetermined threshold value.

12. A motor vehicle with a driver assistance device for recognizing a raised object in an environmental region of the motor vehicle, configured for performing the method according to claim 11, comprising:

a first camera capturing a first image and a second camera with a perspective that is different from the first camera for capturing a second image, wherein the cameras are configured to image the environmental region by the first image and the second image each at least partially, a geometry unit for transforming the first image and the second image into a common reference system according to the respective predetermined transformation instruction, a calculation unit for forming a gradient over pixels along respective gradient lines in the transformed first image and the transformed second image, for summing the gradients along several parallel summation lines to form a respective gradient sum for the transformed first image and the transformed second image, wherein the summation lines and the gradient lines are perpendicular to each other and maxima of the gradient sums represent boundaries of the raised object, for forming a progression of difference from the gradient sum of the transformed first image and the gradient sum of the transformed second image and for determining the raised object, when the progression of difference and/or the integral over the progression of difference exceeds a predetermined threshold value.

* * * * *